United States Patent
Johnson et al.

(10) Patent No.: US 10,439,917 B2
(45) Date of Patent: Oct. 8, 2019

(54) RECOVERING A REPLICA IN AN OPERATOR IN A DATA STREAMING PROCESSING SYSTEM

(71) Applicant: AT&T Intellectual Property I, L.P., Atlanta, GA (US)

(72) Inventors: Theodore Johnson, New York, NY (US); Vladislav Shkapenyuk, New York, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 246 days.

(21) Appl. No.: 15/352,028

(22) Filed: Nov. 15, 2016

(65) Prior Publication Data

US 2018/0139118 A1    May 17, 2018

(51) Int. Cl.
*H04L 12/26* (2006.01)
*H04L 12/24* (2006.01)

(52) U.S. Cl.
CPC ........ *H04L 43/106* (2013.01); *H04L 41/0663* (2013.01); *H04L 41/5009* (2013.01); *H04L 43/022* (2013.01); *H04L 43/0847* (2013.01)

(58) Field of Classification Search
CPC .......... G06F 17/30516; G06F 11/1402; G06F 17/30554; G06F 17/30864; H04L 65/60; H04L 67/10
See application file for complete search history.

(56) References Cited

U.S. PATENT DOCUMENTS

| | | | |
|---|---|---|---|
| 7,292,547 B1 | 11/2007 | Godwin et al. | |
| 7,730,364 B2 | 6/2010 | Chang et al. | |
| 8,131,723 B2 | 3/2012 | Sim-Tang | |
| 8,225,129 B2 | 7/2012 | Douglis et al. | |
| 8,365,017 B2 | 1/2013 | Sim-Tang | |
| 8,401,997 B1* | 3/2013 | Tawri | G06F 11/2064 707/655 |
| 9,037,905 B2 | 5/2015 | Sakurai et al. | |
| 9,298,788 B1* | 3/2016 | Kekre | G06F 11/1402 |
| 9,363,131 B2 | 6/2016 | Parikh et al. | |
| 9,471,438 B1* | 10/2016 | Jacques Da Silva | G06F 11/1451 |
| 9,674,249 B1* | 6/2017 | Kekre | H04L 65/60 |
| 9,973,785 B1* | 5/2018 | Yang | H04N 21/2187 |
| 2010/0293532 A1* | 11/2010 | Andrade | G06F 11/1438 717/140 |
| 2012/0297249 A1* | 11/2012 | Yang | G06F 9/5072 714/19 |
| 2012/0331333 A1* | 12/2012 | Imaki | G06F 11/1658 714/2 |

(Continued)

OTHER PUBLICATIONS

Kwon, YongChul. "Fault-tolerant Stream processing using a Distributed, Replicated File System". Dated Aug. 2008. pp. 1-12.

(Continued)

*Primary Examiner* — Shean Tokuta

(57) ABSTRACT

A device, method and computer-readable medium for recovering a replica in an operator in a data streaming processing system are disclosed. A method may obtain a checkpoint in an input data stream, determine a maximum-timestamp at the checkpoint in the input data stream, calculate a completeness point that is greater than the maximum-timestamp for an output data stream and process data records from the checkpoint onwards that have a respective timestamp that is greater than or equal to the completeness point that was calculated to generate a new replica to replace a failed replica.

18 Claims, 6 Drawing Sheets

(56) References Cited

U.S. PATENT DOCUMENTS

| | | | | |
|---|---|---|---|---|
| 2013/0086418 | A1* | 4/2013 | Sakurai | G06F 11/1446 714/15 |
| 2013/0227053 | A1* | 8/2013 | Bouazizi | H04L 65/1069 709/217 |
| 2014/0304545 | A1* | 10/2014 | Chen | G06F 11/1438 714/4.3 |
| 2014/0304549 | A1* | 10/2014 | Hsu | G06F 11/0793 714/15 |
| 2014/0351639 | A1* | 11/2014 | Vandikas | G06F 11/1438 714/20 |
| 2014/0359271 | A1* | 12/2014 | Gedik | H04L 12/6418 713/100 |
| 2015/0066858 | A1 | 3/2015 | Sabdar et al. | |
| 2015/0081879 | A1* | 3/2015 | Branson | G06F 16/24568 709/224 |
| 2015/0134626 | A1* | 5/2015 | Theimer | G06F 11/1469 707/693 |
| 2015/0317212 | A1* | 11/2015 | Lee | G06F 11/2038 707/685 |
| 2016/0006779 | A1* | 1/2016 | Zhou | G06F 16/24542 709/231 |
| 2016/0306714 | A1* | 10/2016 | De Smet | G06F 11/1451 |
| 2017/0070571 | A1* | 3/2017 | Branson | H04L 67/1097 |
| 2017/0116210 | A1* | 4/2017 | Park | G06F 11/1471 |
| 2017/0208113 | A1* | 7/2017 | Douros | H04L 65/607 |
| 2017/0223075 | A1* | 8/2017 | Hong | G06F 8/65 |
| 2017/0344600 | A1* | 11/2017 | Eidem | G06F 16/24568 |
| 2018/0004437 | A1* | 1/2018 | Battaje | G06F 3/0619 |
| 2018/0129582 | A1* | 5/2018 | Cook | G06F 11/3644 |

OTHER PUBLICATIONS

Fernandez, Raul Castro. "Integrating Scale Out and Fault Tolerance in Stream processing Using Operator State Management". Dated Jun. 2013. pp. 1-12.

* cited by examiner

US 10,439,917 B2

RECOVERING A REPLICA IN AN OPERATOR IN A DATA STREAMING PROCESSING SYSTEM

The present disclosure relates generally to methods, computer-readable media and devices for operator recovery in a data streaming processing system, e.g., recovering a replica in an operator after another replica has failed in a system that processes a stream of records with a guarantee that each record is accounted for exactly once.

BACKGROUND

Data streaming systems are used to perform real-time analysis and recording of flows of data records. Many data streaming systems are best-effort systems, which may drop records whenever they are under overload conditions. Similarly, there may be instances where data streaming systems may experience an unexpected failure of a data source where it may be difficult to ascertain as to what records have already been processed from the failed data source given the sudden interruption. As such, it is possible that the data streaming systems may simply end up processing the same records multiple times, i.e., "over accounting" of the records. Although dropping some records, or over accounting the same records multiple times, may be acceptable for some applications, other applications will require a guarantee that each and every record is accounted for and processed only once.

SUMMARY

In one example, the present disclosure discloses a device, method and computer-readable medium for recovering a replica in an operator in a data streaming processing system. A method may obtain a checkpoint in an input data stream, determine a maximum-timestamp at the checkpoint in the input data stream, calculate a completeness point that is greater than the maximum-timestamp for an output data stream and process data records from the checkpoint onwards that have a respective timestamp that is greater than or equal to the completeness point that was calculated to generate a new replica to replace a failed replica.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
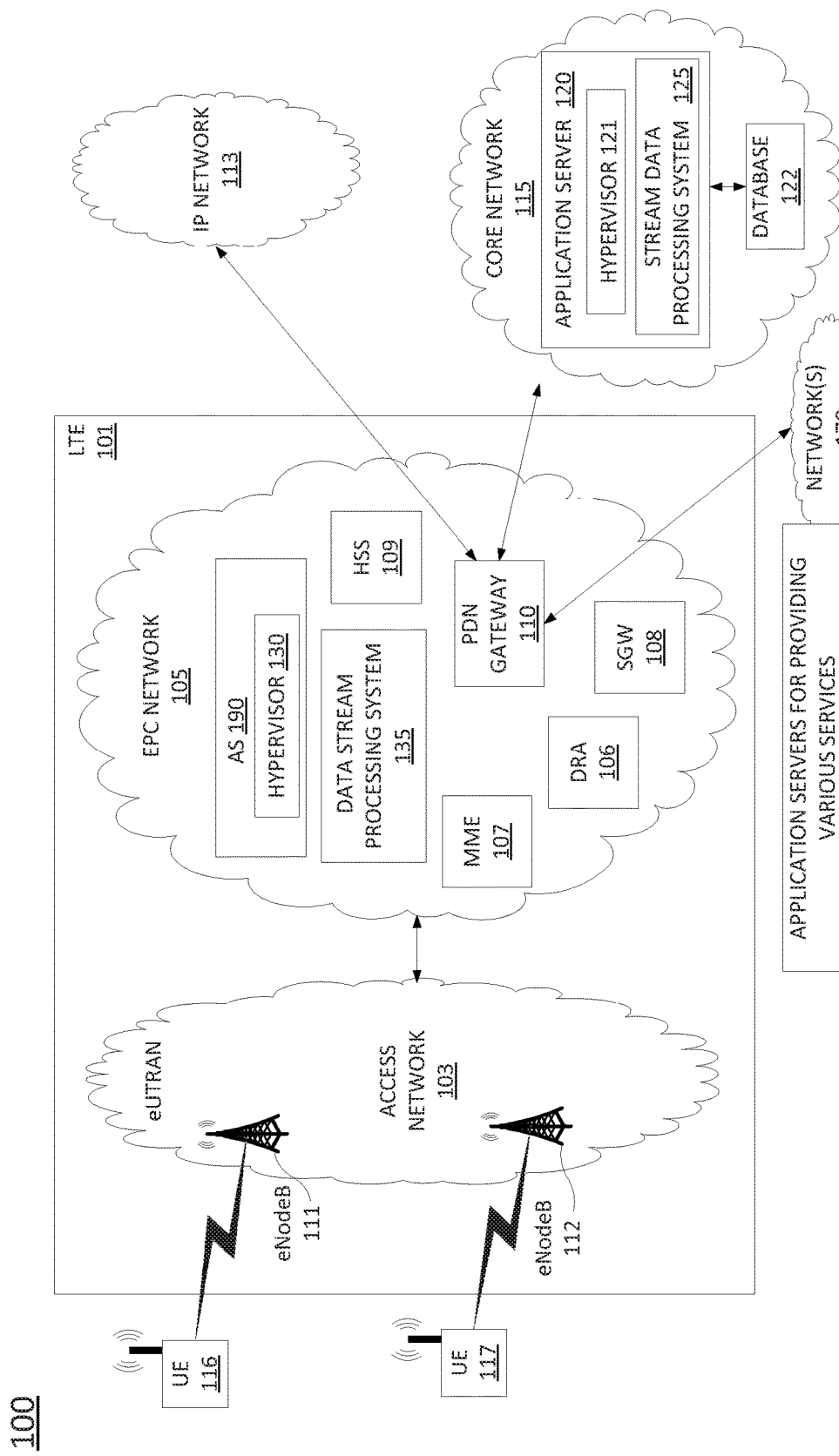
FIG. 1 illustrates an example system related to the present disclosure.

The present disclosure broadly discloses methods, computer-readable media and apparatuses for recovering a replica in an operator in a data streaming processing system with a guarantee that each record is accounted for exactly once. As discussed above, although dropping some records or "over accounting" the same records multiple times may be acceptable for some applications, other applications will require a guarantee that each and every record is accounted for and processed only once.

For example, in certain applications it is very important that each and every record is only processed and counted only once in order to ensure that the results from the real time analysis are truly accurate. In one embodiment of the present disclosure, a streaming processing system is able to provide "exactly once streaming," i.e., there is a guarantee that every record that enters the stream processing system is accounted for only once. Additionally, the streaming processing system of the present disclosure is able to achieve "exactly once streaming," without processing each record as an ACID (Atomicity, Consistency, Isolation, Durability) transaction which is a logging approach that involves the use of a very high-overhead procedure. In contrast, the stream processing system of the present disclosure uses "replication" to ensure reliability.

To illustrate, it is challenging for a network service provider to ensure that customers are satisfied with a given service on an on-going basis due to ever changing conditions. For example, a network service provider may provide a cellular service, but changing conditions may occur, e.g., a network component may fail, a new bandwidth requirement may impact the overall quality of service, and the like. To address this challenge, the network service provider may implement the given service via a software defined network (SDN) architecture, which is capable of reacting to changing conditions. A software defined network is an approach to networking that allows network administrators to manage network services through abstraction of lower-level functionality. For example, the SDN architectures decouple network control and forwarding functions, thereby enabling network control to become directly programmable and the underlying infrastructure to be abstracted from applications and network services. In other words, the SDN technology may comprise a substrate of networking capability, often called network function virtualization infrastructure (NFVI) that is capable of being directed with software and SDN protocols to perform a broad variety of network functions and services. Different locations in the telecommunication network may be provisioned with appropriate amounts of network substrate, and to the extent possible, routers, switches, edge caches, middle-boxes, firewalls and the like, may be dynamically instantiated from a common resource pool. Thus, a software defined network architecture may enable a network (e.g., an access network, a core network, and the like) to scale up or down in the face of changing traffic demands by adding and removing virtual network functions (VNFs), e.g., virtual machines.

Consider a closed-loop network control application. A Virtual Network Function (VNF) is implemented on one or more Virtual Machines (VMs) in a cloud computing center. More specifically, suppose that the VNF implements a network firewall, providing network security to a customer site. A benefit of using a cloud infrastructure to implement VNFs is that the processing power of a VNF can be dynamically adjusted by adding VMs to the collection which performs network functions, e.g., firewall processing when demand increases, or removing VMs when demand decreases.

Managing the virtual network infrastructure requires a complex data stream management system or data stream processing system. Each VNF instance produces a stream of records which indicate its health and processing load. These health and processing load indicators typically comprise multiple measurements collected from different components. For example, the VNF instance might produce a stream of records indicating the number of messages it processed and the number of faults it encountered per second. For example, the hypervisor (e.g., an SDN controller) which manages the VM might produce a stream of records indicating CPU and memory usage over the last second. Thus, given the dynamic nature of the SDN infrastructure, it is important that measurements collected from different components are properly accounted for so that VNF instances can be dynamically instantiated or tore down based on the need of the network traffic. If the measurements collected from different components are not properly accounted for, the SDN infrastructure may not respond properly given that the underlying data that it relies on may not be accurate. Thus, processing a stream of records with a guarantee that each record is accounted for exactly once is important in certain applications such as the management of an SDN infrastructure.

In accordance with the present disclosure, a method and apparatus for recovering a replica in an operator in a data streaming processing system, e.g., recovering a replica when another replica has failed in a shard of the operator and ensuring completeness in the replica that is recovered, while maintaining a guarantee that each record is accounted for exactly once are disclosed. For example, the data processing system of the present disclosure may be configured to ensure reliability by using replication, i.e., employing replicas in the operators for performing duplicate processing. If one replica fails, all consumers which read a stream from the failed replica must switch to reading from a new replica. To maintain the replicas and the ability to perform a failover, a replica must be recovered to replace the replica that has failed. The present disclosure performs a method to recover the replica and ensure the completeness of the replica is maintained during the recovery process. These and other aspects of the present disclosure are discussed in greater detail below in connection with the examples of FIGS. 1-6.

To better understand the present disclosure, FIG. 1 illustrates an example network, or system 100 in which embodiments of the present disclosure for processing a stream of records with a guarantee that each record is accounted for exactly once. In one example, the system 100 comprises a Long Term Evolution (LTE) network 101, an IP network 113, and a core network, e.g., an IP Multimedia Subsystem (IMS) core network 115. In one example, system 100 is provided and operated by a cellular/wireless network operator. FIG. 1 also illustrates various mobile endpoint devices 116 and 117, e.g., LTE user equipment or user endpoints (UE). The mobile endpoint devices UE 116 and 117 may each comprise a cellular telephone, a smartphone, a tablet computing device, a laptop computer, a pair of computing glasses, a wireless enabled wristwatch, or any other cellular-capable mobile telephony and computing device (broadly, "mobile endpoint devices").

In one example, the LTE network 101 comprises an access network 103 and a core network, Evolved Packet Core (EPC) network 105. In one example, the access network 103 comprises an evolved Universal Terrestrial Radio Access Network (eUTRAN). The eUTRANs are the air interfaces of the $3^{rd}$ Generation Partnership Project (3GPP) LTE specifications for mobile networks. In one example, EPC network 105 provides various functions that support wireless services in the LTE environment. In one example, EPC network 105 is an Internet Protocol (IP) packet core network that supports both real-time and non-real-time service delivery across a LTE network, e.g., as specified by the 3GPP standards. In one example, all eNodeBs in the access network 103 are in communication with the EPC network 105. In operation, mobile endpoint device 116 may access wireless services via the eNodeB 111 and mobile endpoint device 117 may access wireless services via the eNodeB 112 located in the access network 103. It should be noted that any number of eNodeBs can be deployed in an eUTRAN. In one illustrative example, the access network 103 may comprise one or more eNodeBs.

In EPC network 105, network devices such as Mobility Management Entity (MME) 107 and Serving Gateway (SGW) 108 support various functions as part of the LTE network 101. For example, MME 107 is the control node for the LTE access network. In one embodiment, MME 107 is responsible for UE (User Equipment) tracking and paging (e.g., such as retransmissions), bearer activation and deactivation process, selection of the SGW, and authentication of a user. In one embodiment, SGW 108 routes and forwards user data packets, while also acting as the mobility anchor for the user plane during inter-eNodeB handovers and as the anchor for mobility between LTE and other wireless technologies, such as 2G and 3G wireless networks.

In addition, EPC network 105 may comprise a Home Subscriber Server (HSS) 109 that contains subscription-related information (e.g., subscriber profiles), performs authentication and authorization of a wireless service user, and provides information about the subscriber's location. The EPC network 105 may also comprise a public data network (PDN) gateway 110 which serves as a gateway that provides access between the EPC network 105 and various data networks, e.g., other IP networks 113, an IMS core network 115, and the like. The public data network gateway is also referred to as a PDN gateway, a PDN GW or a PGW. In addition, the EPC network 105 may include a Diameter routing agent (DRA) 106, which may be engaged in the proper routing of messages between other elements within EPC network 105, and with other components of the system 100, such as a call session control function (CSCF) (not shown) in IMS core network 115.

In accordance with the present disclosure, any one or more of the components of EPC network 105 may comprise network function virtualization infrastructure (NFVI), e.g., SDN host devices (i.e., physical devices) configured to operate as various virtual network functions (VNFs), such as a virtual MME (vMME), a virtual HHS (vHSS), a virtual serving gateway (vSGW), a virtual packet data network gateway (vPGW), or any other network components in any of the networks 170 that provide any other services via one or more application servers 175 outside of cellular service can be virtualized (e.g., a virtual router, a virtual switch, a virtual feature server, a virtual firewall, a virtual database server, a virtual media server, and the like) and so forth. For instance, MME 107 may comprise a vMME, SGW 108 may comprise a vSGW, and so forth. In this regard, the EPC network 105 may be expanded (or contracted) to include more or less components than the state of EPC network 105 that is illustrated in FIG. 1. For instance, EPC network 105 may be expanded to include additional PDN gateways, e.g., in the form of vPGWs, additional serving gateways (SGWs), e.g., in the form of vSGWs, and so forth. In one example, the SDN host devices may be deployed in one or more geographically diverse data centers. Accordingly, in one example, the network may be segregated into a number of zones, where different VNFs may be deployed in different zones depending upon the respective locations of the one or more data centers.

In one example, the EPC network 105 may also include an application server (AS) 190. In one embodiment, AS 190 may comprise a computing system, such as computing system 600 depicted in FIG. 6, and may be configured to provide one or more functions for processing a stream of records with a guarantee that each record is accounted for exactly once, and for performing various other operations in accordance with the present disclosure. For example, AS 190 may be configured to perform functions such as those described below in connection with the example method 400 of FIG. 4. Accordingly, the AS 190 may be connected directly or indirectly to any one or more network elements of EPC network 105, and of the system 100 in general, that are configured to gather and forward network analytic information, such as signaling and traffic data, alarm data, and other information and statistics to AS 190 and to receive instructions from AS 190.

In one example, AS 190 may comprise an SDN controller (or hypervisor) 130 that is responsible for instantiating, configuring, managing, and releasing VNFs. For example, in a SDN architecture, an SDN controller may instantiate virtual network functions (VNFs) on shared hardware, which may be referred to as network function virtualization infrastructure (NFVI), host devices, or SDN nodes, and which may be physically located in various places. For example SDN nodes may reside in various data centers distributed in different locations. For example, a router may be instantiated on an SDN node, and released when the router is no longer needed. Similarly, a media server may be instantiated on an SDN node, and released when no longer needed. In one example, the configuring, releasing, and reconfiguring of SDN nodes is controlled by the SDN controller, which may store configuration code, e.g., computer/processor-executable programs, instruction, code, or the like for various functions which can be loaded onto an SDN node. In another example, the SDN controller may instruct, or request an SDN node to retrieve appropriate configuration code from a network-based repository, e.g., a storage device, to relieve the SDN controller from having to store and transfer configuration code for various functions to the SDN nodes. As used herein, the terms "configured" and "reconfigured," and variations thereof, may refer to programming or loading a computing device with computer-readable/computer-executable instructions, code, and/or programs, e.g., in a memory, which when executed by a processor of the computing device, may cause the computing device to perform various functions.

In one example, AS 190 may be deployed in a network operations center (NOC) of a wireless network operator, e.g., an entity operating the EPC network 105, LTE network 101, access network 103, and so on. Due to the relatively large number of connections available between AS 190 and other network elements, none of the actual links to the application server are shown in FIG. 1. Similarly, links between DRA 106, MME 107, SGW 108, eNodeBs 111 and 112, PDN gateway 110, and other components of system 100 are also omitted for clarity.

In one example, AS 190 may be configured to interact with data stream processing system 135. As discussed above, managing the virtual network infrastructure requires a complex data stream processing system. For example, each VNF instance produces a stream of records which indicate its health and processing load. These health and processing load indicators typically comprise multiple measurements collected from different components. For example, the VNF instance might produce a stream of records indicating the number of messages it processed and the number of faults it encountered per second. For example, the hypervisor 130 (e.g., an SDN controller or a virtual machine manager) which manages a VM that may produce a stream of records indicating CPU and memory usage over a period of time, e.g., the last second. As such, the data sources feeding data streams to the data stream processing system 135 may comprise a plurality of VNF instances in the EPC network and a subscriber to an output stream of the data stream processing system 135 may be the hypervisor 130 or any other consuming applications that need the output stream. The use of term "subscriber" or "consumer" encompasses a consuming application or any network function that needs the output stream from the data stream processing system 135. Similarly, the core network 115, e.g., an IMS network, may also employ an SDN infrastructure for various network components (not shown) deployed in the core network 115. As such, the core network 115 may also include an application server 120 that employ a hypervisor 121 and a data stream processing system 125 for managing the VNF instances of the core network 115 with a database 122 for storing any number of records or pertinent data that is needed. In fact, similar arrangements can also be found in networks 170 and IP network 113, where a respective hypervisor, a respective data stream processing system, and one or more respective VNF instances can be deployed in the respective network. The one or more VNF instances will correspond to the underlying services provided by the networks. For brevity, any network functions in these networks can be implemented on one or more VMs supporting one or more VNF instances.

The foregoing description of the system 100 is provided as an illustrative example only. In other words, the example of system 100 is merely illustrative of one network configuration that is suitable for implementing embodiments of the present disclosure. As such, other logical and/or physical arrangements for the system 100 may be implemented in accordance with the present disclosure. For example, AS 190, and/or other network components may be deployed in an IMS core network 115 instead of being deployed within the EPC network 105, or in other portions of system 100 that are not shown, while providing essentially the same functionality.

In addition, although aspects of the present disclosure have been discussed above in the context of a long term evolution (LTE)-based wireless network, examples of the present disclosure are not so limited. Thus, the teachings of the present disclosure can be applied to other types of wireless networks (e.g., 2G network, 3G network and the like), for deploying virtual network functions in response to detecting an emergency event. Thus, these and other modifications are all contemplated within the scope of the present disclosure.

Figure 2:
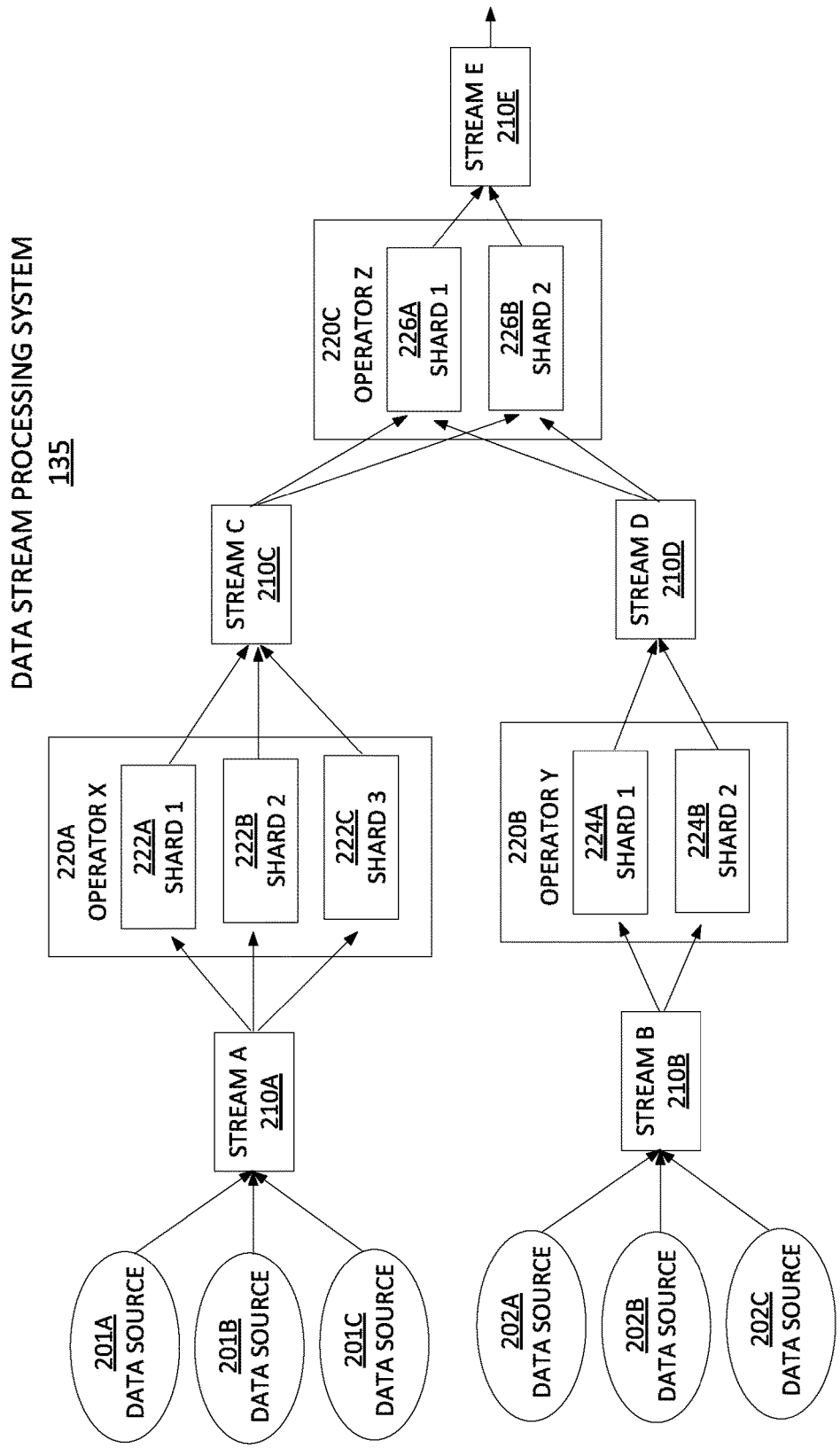
FIG. 2 illustrates an example of a data stream processing system.

FIG. 2 illustrates an example data stream processing system 135 with greater details. The data stream processing system 135 comprises one or more operators (e.g., 220A, 220B, and 220C) receiving a data stream (e.g., 210A, 210B) provided by a plurality of data sources. Each operator in turn provides an output stream (e.g., 210C, 210D, 210E) that is provided to another operator or a subscriber, e.g., a hypervisor that is interested in the output stream.

To illustrate, a collection of data sources (201A, 201B, 201C, 202A, 202B, and 202C) provide the input to data stream A (210A) and stream B (210B). In one embodiment, a data source is an external entity that generates records, and a data stream is a grouping of records with similar properties. A stream can be thought of as the transport mechanism which moves records from one processing node to the next. In one embodiment, the logical program which consumes one or more streams and produces some output in return is referred to as an "operator" (e.g., operator X 220A, operator Y 220B, and operator Z 220C). In the example, stream A is processed by operator X, which is implemented using three shards. Each shard is a processing node which implements an operator and receives a portion of the input stream. In this example, operator X 220A executes on three shards 222A, 2226, and 222C, while operator Y 220B and operator Z 220C execute on two shards 224A-224B, 226A-226B, respectively.

It should be noted that the operator may encompass any operations in accordance with the deployment requirements of an application. For example, the operators may encompass the following list of operator types:

1. Selections, data transformations;
2. Highly time-localized joins and aggregations;
3. Joins against externally-generated temporal reference tables;
4. Joins against internally-generated reference tables (e.g. analyze the RADIUS protocol to get ipv4-to-customer_id mappings);
5. Long-lived analytical state: running aggregates, regular-expression style event detection; and
6. Per-entity slates (e.g. on-line customer tracking)—externally accessible.

These are only illustrative operator types and should not be interpreted as a limitation of the present disclosure.

The data streams can be implemented using a distributed queueing mechanism. These queues generally move records from multiple sources to multiple destinations while providing various levels of reliability guarantees. For example, the message queue might guarantee that if a record is inserted in the queue, it is correctly distributed to all intended recipients, as long as no failures occur.

Message queueing systems such as Apache Kafka might provide stronger guarantees, such as message ordering and reliable replay of old messages. A message queueing system might have provisions for proper routing of messages. This routing might depend on properties of the messages, e.g., using a hash of a key field. A message might be routed to multiple shards, e.g., the routing policy might be "replicate all." Different systems may have different types of stream definitions. For example, Java-based systems may combine a record definition (i.e., schema) with a stream. For example, all records in a data stream have the same schema, whereas two different streams may have different schemas. A stream is a transport from one operator to another. A stream can also be identified as the output of an operator.

The sharded stream system as shown in FIG. 2 that relies on massive distributed parallelism may have mechanisms that allow processing nodes to enter and leave the system. For example, the server running shard 2 222B of operator X 220A may fail. The failure may result in a change in configuration, e.g., stream A must be informed of the change in configuration and distribute its records to shard 1 222A and shard 3 222C only. If the load for operator X 220A is too high for only two shards to handle, and additional processing node, say shard 4, can be started and added to the configuration. Configuration management can be done through a distributed database such as Apache Zookeeper. In one embodiment, the sharded system of the present disclosure may provide a graceful method for adding and deleting processing nodes that serves to provide the basic mechanism for load balancing and dynamic allocation of processing resources. For example, lightly loaded operators give up processing nodes, while heavily loaded operators receive additional processing nodes.

Including or excluding shards requires a careful coordination of stream configuration and state management to provide processing guarantees. The problem with a lack of processing guarantees may be summarized in two scenarios: "at most once" and "at least once" during failure situations. In an "at most once" processing guarantee, a record provided by the data source will not be processed twice. In practice, this guarantee means that there is no reliability mechanism at all in the system. If a processing node in a stream message queue fails, or if a shard fails, no attempt is made to recover their state. Thus, records may be lost. In an "at least once" processing guarantee, a record provided by the data source will be processed at least once, and possibly multiple times. This guarantee is implemented by having the data sources persist the input records until they are "fully processed." If a record contributes to multiple other records, then the record must be fully processed and all associated records must also be processed. Thus, during a failure some records may be "over accounted," i.e., the same record may be accounted for multiple times. In order to address these two scenarios, some systems employ extensive logging and exchanges of confirmation messages between the data sources and the coordinator of the data stream processing system. Although effective in terms of providing the necessary processing guarantees, such "heavyweight" approaches do not scale well to scenarios where the stream may comprise millions to tens of millions of records per second.

In one embodiment of the present disclosure, the data stream processing system 135 is able to process a stream of records with a guarantee that each record is accounted for "exactly once." As discussed above, the SDN infrastructure will benefit from a data stream processing system that is able to provide an accurate accounting of processed records to assist a hypervisor in the management of the SDN. However, it should be noted that many other applications outside of network management may also benefit from a process that guarantees that each record is accounted for "exactly once." For example, web applications related to advertising may want such strong guarantees, e.g., for an application that assesses a charge for every displayed advertisement, while assuring clients that they are not being over charged due to over-counting errors. In another example, a trend detecting method may parse text messages or tweets to counts words for detecting what topics are trending and so on.

Figure 3:
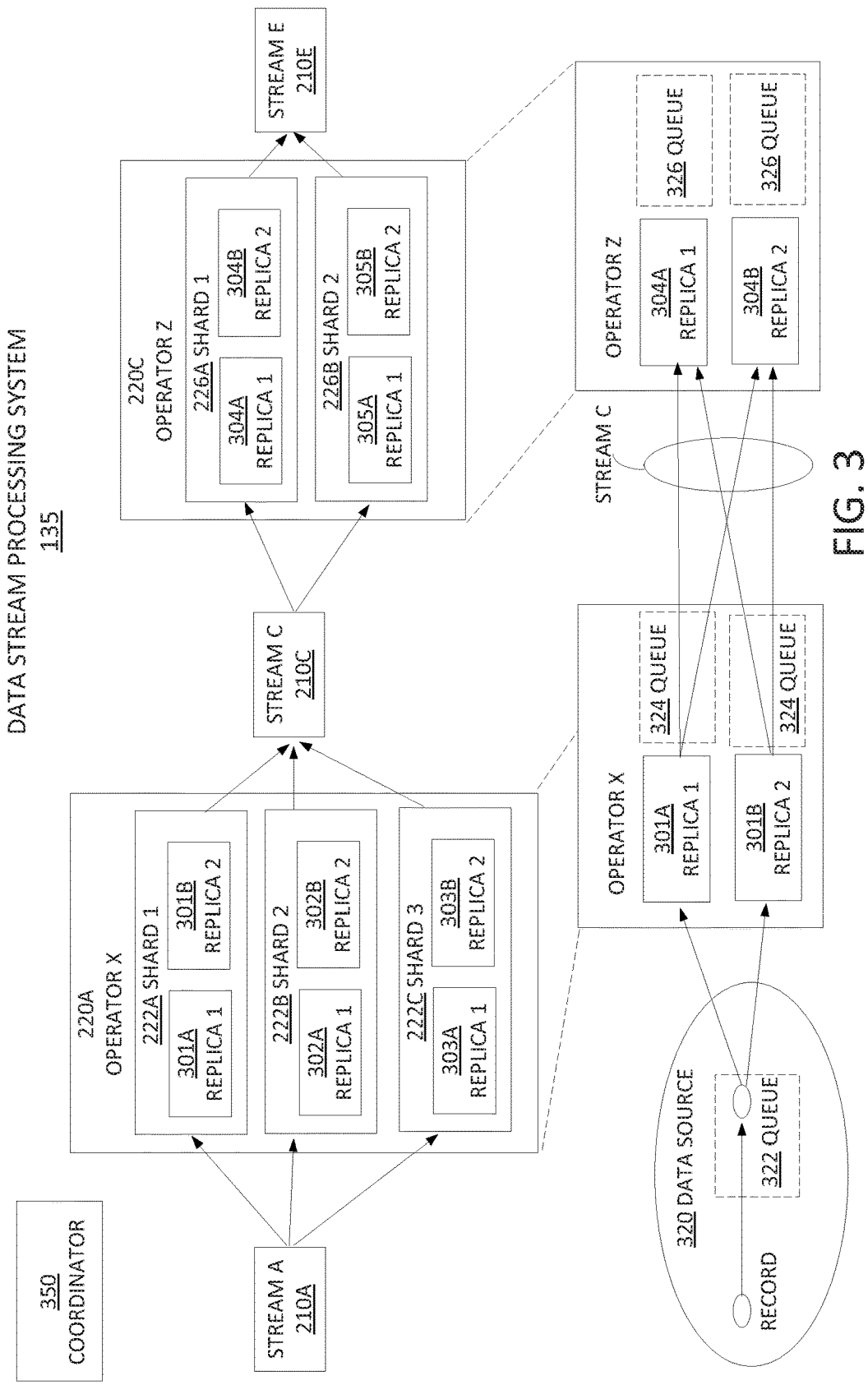
FIG. 3 illustrates an example of another data stream processing system related to the present disclosure.

FIG. 3 illustrates an alternate example data stream processing system 135 with greater details. The data stream processing system 135 of FIG. 3 is similar to the data stream processing system 135 of FIG. 2, but is simplified to just show the interaction of operator X 220A and operator Z 220C to show modifications made to the operators. It should be noted that these modifications can be carried to each of the operators as shown in FIG. 2. Furthermore, the data stream processing system 135 is shown with a coordinator 350, e.g., a controller, that is used to coordinate the various functions of the data stream processing system 135, e.g., shard generation and removal, replica generation and removal, data source registration and de-registration, consuming application or subscriber registration and de-registration, resilient queue management, failure detection and the like. The functions performed by the coordinator will depend on the requirements of a particular implementation of the data stream processing system 135.

Returning to FIG. 3, unlike the operators in FIG. 2, each shard in each operator is implemented with two replicas, e.g., 301A-301B, 302A-302B, 303A-303B, 304A-304B, 305A-305B. For example, operator X and operator Z each runs two copies of each shard. The replicas generally execute independently. If replica 1 301A of shard 1 222A fails, a subscribing node, e.g., the hypervisor or another operator 220C, can switch to ingesting records from replica 2 301B of shard 1 222A. Similarly, if replica 1 302A of shard 2 222B fails, a subscribing node, e.g., the hypervisor or another operator 220C, can switch to ingesting records from replica 2 302B of shard 2 222B. Similarly, if replica 1 303A of shard 3 222C fails, a subscribing node, e.g., the hypervisor or another operator 220C, can switch to ingesting records from replica 2 303B of shard 3 222C and similarly for the shards of operator Z 220C as well. It should be noted that an operator or a subscriber is only ingesting or consuming records from one of the replicas, but not from both replicas at any given time. Thus, although each record is technically processed twice via two replicas, each record is only accounted for once.

Furthermore, FIG. 3 illustrates a further simplification where multiple shards are not employed in each of the operators. Then each of the operators X and Z will simply have a pair of replicas. As shown, each replica in the operator will forward a separate stream to each of the replicas in the next operator. As such, the stream 210C shown in FIG. 3 as a single stream contains a plurality of channels of streams. This embodiment effectively allows the "next" operator or a subscriber node to selectively use different channels of data within stream 210C. Thus, if one of the replica in an operator fails, then the "next" operator or a subscriber node may seamlessly select a different channel from the stream 210C.

Thus, the present disclosure provides a data stream processing system that processes a stream of records with a guarantee that each record is accounted for exactly once using replication. The present system is able to provide clean semantics that allows for code generation from high-level languages and query system optimization. Furthermore, the present system provides elastic scaling while also allowing for a great deal of flexibility for new data sources to be added or snapped into a stream (if their schemas match), and new applications can be quickly added to an existing stream system by having the application subscribe to the proper stream message queues.

In one embodiment, a messaging layer to transport records from data sources, through all operators, and to the subscribing applications is provided. For example, the message queues should support certain properties (e.g., reliable property, persistent property, and resilient property) to ensure that a method for processing a stream of records with a guarantee that each record is accounted for exactly once will work.

To illustrate, a message queue is "reliable" if each component ensures that a message is delivered to all consumers or subscribers that subscribe to that component, as long as the component has not failed. A message queue is "persistent" if it stores messages for a period of time, e.g., X seconds, after receiving them. A message queue is "resilient" if it ensures that all messages are delivered to all consumers or subscribers. In one example, a message queue may have several processes located across several servers. A particular server in the message queue may be responsible for delivering its messages to a set of consumers C. The reliable property indicates that the message queue server retries message delivery until it receives an acknowledgement from each consumer c in C. The persistence property indicates that messages are stored for a period of time. For example, a persistent message queue may be a component that is used to build a resilient message queue. Also, a persistent message queue can be a service that is provided to consuming applications. Finally, the resilience property ensures that all messages are pushed through the exactly-once processing system and to the consuming applications. In one example, there is an interaction between the operation of the resilient message queue and the recovery model of the consuming application.

In a first example as shown in FIG. 3, it is assumed that the replica recovery mechanism for operator X (e.g., illustrated as the lower example operator X without shards) is that it receives all messages from the data source starting at some point after it joins the operator execution. Then the reliable queue 322 deployed at the data source 320 needs to ensure that all messages are delivered to all working replicas e.g., 301A and 301B. In one embodiment, the reliability mechanism is simply to maintain separate message delivery queues for each replica and using a reliable transport protocol such as Transmission Control Protocol (TCP).

However, if the data source 320 fails, then the data source's reliable queue 322 may have delivered message m to replica 1 301A but not to replica 2 301B. There are several ways to handle this issue and ensure resilient delivery. In a first example, the method may execute a distributed commit protocol to ensure that both replicas, e.g., 301A and 301B, receive the same set of message. For example, the method may use a running two-phase commit protocol to deliver messages. The replicas, e.g., 301A and 301B, continually acknowledge the messages they receive. When the reliable queue 322 executing at the data source receives acknowledgements from all replicas, it sends a release message to the replicas. In one embodiment, if the data source fails, the replicas may coordinate to determine the maximum set of released messages. In a second example, the method may use an external component outside of the data source that implements a resilient queue instead, such as Apache Kafka or Apache Samza.

In another example, suppose that there are two replicas of operator X and two of operator Z as shown in FIG. 3, and that operator Z recovers a new replica by having it connect to the output of operator X and receiving all new messages. Then a resilient queue 324 can be implemented by building a reliable queue at the replicas of operator X and have them deliver to both replicas of operator Z. De-duplication is required, but the system is resilient to the failure of any single replica.

In yet another example, a consuming application that consumes messages from operator Z may need to receive every output message, but it does not have any native support for resiliency. Suppose that operator Z maintains persistent output queues 326. If the consuming application fails, upon restart, the consuming application may contact the operator Z and load any missing messages.

In one embodiment of the present disclosure, the data stream processing system employs shards in the operators. However, this configuration is not a requirement of the present disclosure and may depend on the requirements of a particular implementation. In one embodiment, shard replicas are used for resilience as shown in FIG. 3 above. Each replica executes its portion of its shard of the operator. In one example, each replica is an independent peer. However in an alternate embodiment, the data stream processing system may implement a master-spare relationship between the replicas, e.g., a master replica and a hot spare replica, and the master replica streams important state to the one or more spare replicas, e.g., the order in which to process messages. This global ordering may help to ensure deterministic processing and output record ordering, but the use of the master-spare relationship is an option and not a requirement of the present disclosure.

In one embodiment, if a replica fails, then consuming applications or a subscriber may recover from the failure by subscribing to a remaining live replica. Under the assumption of determinism, all replicas of an operator will produce the same output. The resilient message queue will ensure that the subscriber recovery occurs with no lost or duplicate records. Therefore, if there is no failure (and no reshuffling of shard responsibility), then the replicas do not need to communicate.

In one example, if one of the replicas fails, then it may be necessary to bring up a replacement replica rapidly. The support for replica replacement in turn depends on the nature of the state maintained by the operator.

In one embodiment, operators may have no state. In other words, some operators may store no state at all, and instead perform selections and transformations on their input stream. For example, a stateless operator may perform regular-expression feature extraction and pass on matching records with their extracted features. An operator with no state can be recovered by simply connecting the replacement replica of the operator to the input stream and resuming processing.

In another embodiment, operators may have short-lived state. In other words, some operators in a data reduction stream processing system may keep a significant amount of state, but only for a limited time period. For example, the operator may compute 5-minute aggregates, or the operator may perform a band join between two source streams with an e.g., 1-minute band range. These operators can be recovered by connecting them to their source stream(s) and waiting until the operators have recovered any required states.

In another embodiment, operators may have external data. In other words, some operators may perform joins against relatively static data loaded from an external source. For example, packet classification via IPV4 address longest prefix matching. This type of operator must load the external table and start participating in the table's refresh protocol before resuming processing. In normal processing, this table must be occasionally refreshed. One example procedure for installing a new table is to transfer the table to each replica, and when the transfer is confirmed, schedule the replicas to use the new table for records with a timestamp e.g., 10 seconds in the future or larger.

In another embodiment, operators may have long-lived state. In other words, some operators may make use of long-lived state via a table. For example, some operators may make use a join against a temporal description table that is derived from a data stream. For example, a mapping of (ip address→customer ID) derived from monitoring, e.g., the radius protocol.

The approach for replica replacement for long-lived state is as follows. First, freeze the state of the table at a particular replica at a particular time "Tf." Records with timestamp larger than Tf are buffered. When a "punctuation" record arrives indicating that all records with timestamp <=Tf have arrived and been processed, make a copy of the table. For example, one option for making a copy of the table is to fork the process. Second, once the copy is made, transfer the state to the replica. Third, after the replica receives the state, it rewinds the input stream to access all records with timestamp >Tf, and executes them on the received state. Alternatively, the replica can start by subscribing to the stream, and then buffering records with timestamp >Tf until the state arrives. Finally, the state transfer can occur incrementally by dividing the state into R ranges and transferring each in turn. Incremental transfer might be useful if the state is large and transferring it would be disruptive.

As noted above, if a replica fails, then consuming applications or a subscriber may recover from the failure by subscribing to a remaining live replica. A mechanism for ensuring that the exactly-once processing property of the resilient queue is maintained during failure is to recover the failed replica. In addition, the failed replica is recovered with completeness. In other words, the recovered replica will produce all records that the failed replica would have produced after the completeness point. Embodiments of the present disclosure provide a method for recovering a replica in an operator in the data stream processing system 135.

In one embodiment, the method may include obtaining a checkpoint in an input data stream, determining a maximum-timestamp at the checkpoint in the input data stream, calculating a completeness point that is greater than the maximum-timestamp for an output data stream and processing data records from the checkpoint onwards that have a respective timestamp that is greater than or equal to the completeness point that was calculated to generate a new replica to replace a failed replica. In one embodiment, the new replica may be formed by available resources (e.g., a virtualized machine, a docker container, a JVM, and the like) that are available in the system 100.

In one embodiment, how the checkpoint obtained and the maximum-timestamp are determined may depend on data channel properties. In addition, how the completeness point is calculated may depend on a state of the operator (e.g., a stateless operator, a limited state operator, an operator that access an external state and an operator with a long-lived state as described above).

In one embodiment, the replica may be a "complete" stream in a sense that the replica contains all data records or messages within a particular timestamp range. More precisely, the output data stream of a replica is complete from time "t" if it contains all data records in the data stream whose timestamps are between "t" and "punct_ts," where "punct_ts" is the timestamp attached to the last punctuation produced by a replica that has failed.

In one embodiment, a distributed persistent queue may be used to ensure a reliable data channel. One example includes Kafka that uses a strongly consistent distributed shared memory system such as Zookeeper. In one embodiment, producer operators may place data records into the distributed persistent queue. The producer operators may write a maximum-timestamp into the distributed persistent queue along with the positions of the maximum-timestamp within the distributed persistent queue. When a replica of the producer operator fails, a consumer operator that was reading from the failed replica may switch to reading from the queue of a different replica of the producer operator. The consumer operator may use punctuations supplied in the data stream of the failed replica along with the maximum-timestamps that are checkpointed into the distributed persistent queue to determine a rewind point for reading from the queue of the live replica.

"Punctuation" (broadly a control message with timing information about produced data) may be one method for time management in the data stream processing system 135. When an operator receives punctuations, it can progress its computations, garbage-collect obsolete state, and perform actions to reduce the cost of failure recovery. In one example, the punctuation mechanism may assume that the stream queue is in shared memory and is not resilient to failure (e.g., if the server fails, the entire stream computation fails). For a "scale-out" system in which data sources, operators, and stream queues execute over many servers distributed in a cluster computing environment, the punctuation management system should be resilient to failures.

As such, "punctuation messages" or "punctuation records" must originate at the sources of the data, to assist the data streaming processing system. For example, a data source must periodically (e.g., once per 0.5 seconds, once per second, once per 1.5 seconds, and so on) determine the minimum timestamp, min_ts that will ever be attached to any future record, then insert a punctuation record with timestamp min_ts−1 into its output stream. In most cases, the data source can sample its own local clock and timestamp the records that the data source generated with a clock sample. In this case, the timestamp associated with the punctuation record is the clock sample minus one. Broadly, a punctuation record is a control message that is inserted in-band into the record stream. As such, a punctuation record may contain fields in addition to min_ts. For example, the producer (e.g., a data source) of the stream might track maximum timestamp, the maximum timestamp value of any record inserted into the record stream, and attach that as a field of a punctuation message.

An operator in a data streaming processing system may receive data from multiple sources. Each independent source will then produce its own punctuation records. The operator receiving these punctuation records must store them in a table mapping source id to a latest punctuation record. The operator may use this table to perform its processing, and also to generate its own punctuation records for its output stream. Table 1 illustrates such an example punctuation table below:

TABLE 1

| Data Source | Latest Punctuation |
|---|---|
| 1 | 57 |
| 2 | 58 |
| 3 | 56 |
| 4 | 57 |

For an example as to how an operator will process the punctuation records, the present example will use the merge operator as an illustration. In some cases, an operator may need to process data in timestamp order. However this data may arrive from many data sources (where it is assumed that the records from any single data source will arrive in timestamp order). In this example, a merge operator is used to obtain the timestamp-sorted order. An illustrative merge operator may work as follows: 1) when a record arrives, it is placed in a queue associated with the data source, 2) when a punctuation record arrives, the punctuation table that has the mapping of source_id to the latest_punctuation record, will be updated, and 3) if the punctuation record causes the minimum value of latest_punctuation record to increase, then the record with timestamp less than or equal to the new minimum latest_punctuation value are extracted from the queues, placed in timestamp-sorted order, and output from the operator.

For example referring to Table 1, suppose a new record from data source 1 arrives. Since the latest_punctuation record from source 1 is 57, the new record must have a larger timestamp, say 58. Next a new record from data source 3 arrives with timestamp 57. Next, a punctuation record from data source 3 arrives with timestamp 57, moving the latest_punctuation for data source 3 from 56 to 57. The new minimum punctuation record is now 57, so all records with timestamp less than or equal to 57 are released to the output stream of the merge operator (e.g. the record with timestamp 57 that arrived from data source 3). As an optimization, records with timestamp min_punctuation+1 can also be released, e.g., the record from data source 1. The merge operator itself can generate punctuation regularly (e.g., once per second) by computing the minimum value of latest_punctuation and attaching that value as the timestamp of the punctuation record. All records with smaller timestamps must be placed in the output queue first and so on.

In order for a data stream processing system to handle control messages (i.e., punctuation records) in the stream, control messages are marked as being either "control" or "data." There are a variety of ways of implementing this requirement, and one illustrative example is as follows:

| | |
|---|---|
| Control_message | True |
| Timestamp | 1455312148 |
| Source | Operator = 4, replica = 2 |
| Maximum_timestamp | 1455312152 |

In one embodiment, a producer operator may be used to ensure the reliable data channel. For example, the producer operator may buffer the data records that the producer operator has produced. This approach may be supplemented by a strongly consistent distributed shared memory system such as Zookeeper.

In one example, the producer operator may buffer the data records the producer operator produces annotated with a value of a maximum-timestamp. The consumer operators may publish the latest timestamp values from the punctuations of the data records that have been processed into the distributed shared memory system. The producer operator may use this information to purge unnecessary data records from the buffer of the producer operator. When a replica of the producer operator fails, the consumer operator that was reading form the failed replica may switch to reading from a different replica of the producer operator. The consumer operator may send the latest timestamp value form the punctuation of the latest data records the consumer operator has processed from the failed replica to the live replica. The live replica of the producer operator may use the information, along with the maximum-timestamp value, to determine a rewind point for replaying the buffer to the consumer operator.

In one example, the consumer operator may buffer the data records. The consumer operator may subscribe to at least two different replicas of a producer operator. One replica may be a primary replica that the consumer operator reads from and another replica may be a secondary replica that is buffered by the consumer operator. When a punctuation with a timestamp value "punct_ts" is consumed from the primary, data records with a smaller or equal timestamp are purged from the secondary replica buffer. When the primary replica fails, the consumer operator may switch to reading data records from the secondary replica buffer and then from the secondary replica.

In one embodiment, the operator may be a stateless operator. When the operator is a stateless operator the completeness point may be calculated by simply choosing a time that is greater than the maximum-timestamp value that is obtained. For example, if the maximum-timestamp value is t=25, then the completeness point may be chosen to be t=26. Then, the operator may start processing data records that have a timestamp greater than the completeness point beginning from the checkpoint using the rewind processes described above. The checkpoint and the maximum-timestamp value may be obtained using one of the methods described above depending on whether the data channel is a distributed persistent queue, buffered at the producer operator or buffered at the consumer operator. In one embodiment, if the operator has multiple input data streams, the method may be modified to select a completeness point that is greater than the respective maximum-timestamp of every input data stream.

In one embodiment, if the operator transforms the value of the timestamp of input data records it may be assumed that the transformation of a timestamp "ts" is always in the range [ts+a, ts+b], where a<=b. Both a and b can be negative. Then the completeness point may be greater than the maximum-timestamp+b. Data records with a timestamp that are larger than the maximum-timestamp may be processed, but only data records that have timestamps greater than or equal to the completeness point may be output.

In one embodiment, the operator may be a limited state operator. For example, some operators may store a state about a data record for a limited duration. However, after a period that can be determined a-priori, no output record will be affected by the state of the input data record. For example, the operator may perform aggregation within particular time buckets (e.g., counting the number of word occurrences in a tweet stream by five minute intervals). In another example, an operator may count the number of word occurrences in a tweet stream using a sliding window of 20 minutes with an output once per minute. In yet another example, the operator may join two input data streams R and S with a band join predicate (e.g., R.ts BETWEEN [S.ts−a, S.ts+b]).

In all of the above examples, there may be a function "RETIREMENT (ts; i)" that returns the minimum timestamp of an output record that will not be affected by an input record from stream "i" with timestamp "ts." The function "RETIREMENT (ts; i)" may be upper bounded by the function "ts+$L_i$." In one embodiment, "$L_i$" may represent the value of the time interval. For example, if the operator counts the number of word occurrences in a tweet stream by five minute intervals, then $L_i$ is 5 minutes. If the operator counts the number of word occurrences in a tweet stream using a sliding window of 20 minutes, then $L_i$ may be 20 minutes. If the operator performs a band join between two streams, R and S with a band join predicate (e.g., R.ts BETWEEN [S.ts−a, S.ts+b]), and the timestamp of the output record is S·ts, then LR is b and Ls is 0. The function "RETIREMENT (ts; i)" can be set to ts+$L_i$, but other examples may be used.

Thus, the completeness point for a limited state operator may be calculated by selecting the completeness point to be greater than "RETIREMENT (ts; i)", where ts=the maximum-timestamp and i=0, and declare the value selected as the completeness point of the output stream. If the operator has multiple input streams, the method may be modified to select a completeness point that is greater than the respective value of "RETIREMENT (ts; i)", where ts=the maximum-timestamp and i=0 for every input data stream.

In one embodiment, the stateless operator and the limited state operator may access an external state or have a long lived state. In one embodiment, when the operator access an external state, the methods described above for the stateless operator or the limited state operator may be performed in addition to the method for access the external state.

In one embodiment, the method for accessing the external state may have the system coordinator announce that new external data is available. Each replica may access the new external data. Each replica may post a time "tr" at which each replica can safely switch to processing to the new external data. The system coordinator may post a time "te" where "te">="tr" for each "tr" as the timestamp for which the replicas should switch to processing using the new external data. The replica may block processing for data records whose timestamps would be greater or equal to "tr" until the value of "te" is determined.

When a replica of an operator that accesses external data is started, the replica may choose a completeness point as described above depending on whether the replica is in stateless operator or a limited state operator. Concurrently, the replica may access the external data and engage in a method that distributes the new external data. If the new external data is only available for an installation time "te" that is larger than the chosen completeness point, then the completeness point may be set to "te."

In one embodiment, the operator may have a long-lived state. For example, the operator may maintain a state of past data records for indefinite periods of time. Some examples include complex-event processing (e.g., regular expression matching on events in a data record stream), long-lived customer scoring models, and the like. When the operator has a long-lived state, the methods described above for the stateless operator or the limited state operator may be performed in addition to the method for the operator having a long-lived state.

For example, a new replica may contact a live replica for a state transfer. The live replica may choose a time point "tf" such that the state to be transferred reflects all data records with a timestamp that is less than or equal to "tf," but no data records with a timestamp greater than "tf." The live replica my freeze its state at time "tf" making a copy of the state and block internal processing until the copy is complete. The copy may be transferred to the new replica. The new replica can start processing data records with timestamp "tf" or larger.

Thus, the present disclosure may recover a replica in an operator. The recovery method may ensure that new replicas are complete. As a result, when a replica fails, a new replica may be recovered to ensure that data channel resiliency can be maintained while guaranteeing that each data record is processed only once.

Figure 4:
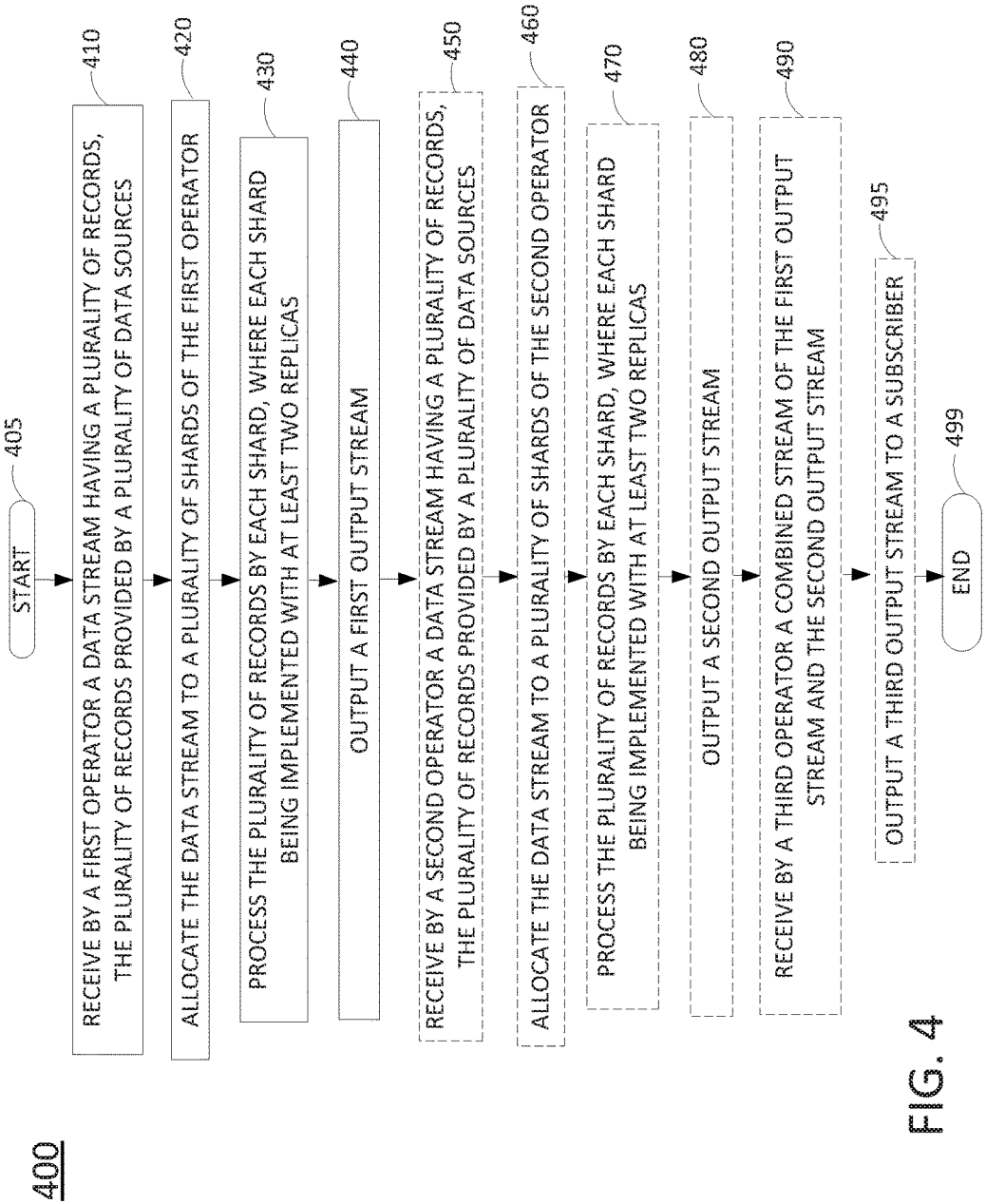
FIG. 4 illustrates a flowchart of an example method for processing a stream of records with a guarantee that each record is accounted for exactly once.

FIG. 4 illustrates a flowchart of an example method 400 for processing a stream of records with a guarantee that each record is accounted for exactly once. In one embodiment, the steps, operations or functions of the method 400 may be performed by any one or more of the components of the system 100 depicted in FIG. 1. For example, in one embodiment, the method 400 is performed by the application server (AS) 190. In another embodiment, the method 400 is performed by AS 190 in coordination with other components of the system 100. In another example, the method 400 is performed by hypervisor 130 of FIG. 1, or by data stream processing system 135 or coordinator 350 in coordination with other components of the system 100. Alternatively, or in addition, one or more steps, operations or functions of the method 400 may be implemented by a computing device having a processor, a memory and input/output devices as illustrated below in FIG. 6, specifically programmed to perform the steps, functions and/or operations of the method. Although any one of the elements in system 100 of FIG. 1 may be configured to perform various steps, operations or functions of the method 400, the method will now be described in terms of an embodiment where steps of the method are performed by a processor, such as processor 602 in FIG. 6. For example, processor 602 may be deployed in a communication network to perform the method 400.

The method 400 begins in step 405 and proceeds to step 410. In step 410, the processor, receives via a first operator (e.g., operator x) a data stream (e.g., stream A) having a plurality of records, the plurality of records provided by a plurality of data sources (e.g., data sources 201A-201C).

At step 420, the processor allocates the stream to a plurality of shards of the first operator, e.g., shards 222A-222C.

At step 430, the processor processes the plurality of records by each shard, where each shard being implemented with at least two replicas (e.g., 301A-301B; 302A-302B; 303A-303B).

At step 440, the processor outputs a first output stream (e.g., stream C) to another operator or a subscriber or a consuming application.

If the data stream processing system 135 employs a plurality of operators (e.g., a second operator such as operator Y and a third operator such operator Z), then optional steps 450-480 can be executed for a second operator (e.g., operator Y). In optional step 450, the processor, receives via a second operator (e.g., operator Y) a data stream (e.g., stream B) having a plurality of records, the plurality of records provided by a plurality of data sources (e.g., data sources 202A-202C).

At optional step 460, the processor allocates the stream to a plurality of shards of the second operator, e.g., shards 224A-224B.

At optional step 470, the processor processes the plurality of records by each shard, where each shard being implemented with at least two replicas.

At optional step 480, the processor outputs a second output stream (e.g., stream D) to another operator or a subscriber or a consuming application.

In optional step 490, the processor, receives via a third operator (e.g., operator Z) a data stream (e.g., a combined stream of stream C and stream D) having a plurality of records, the plurality of records provided by a plurality of operators (e.g., operators 220A and 220B).

At step 495, the processor outputs a third output stream (e.g., stream E) to another operator or a subscriber or a consuming application. It should be noted that operator Z may perform similar steps (not shown) to those of steps 420-430 or steps 460-470 to generate the third output stream. Method 400 then ends in step 499.

In one embodiment, it should be noted that a subscriber or a consuming application may perform one or more actions based on the received streams. For example, a data stream processing system which manages a firewall VNF in a SDN might operate as follows. A first operator O1 collects messages from the firewall VNFs and transforms them into a standardized record. Operator O2 reads the output of O1 and computes a 30-second sliding window average of the messages-processed and faults indicators, producing one output record per second. A third operator O3 collects messages from all VMs in the computing center and uses an external table which maps VMs to the VNF that they implement to compose a stream of messages related to the VM resource usage (e.g., CPU and memory usage) of the VMs which implement the firewall. The outputs of O1, O2, and O3 are sent to operator O4 which correlates these streams to create a message indicating (messages-processed, faults, CPU-usage, memory-usage) for each VM implementing the firewall VNF, per a predefined time period, e.g., once per second. The output of O4 is sent to operator O5 which collects and maintains a long-lived model of operating state of each VM implementing the firewall VNF. Operator O4 not only maintains this long-lived model of each VM, but it produces alert messages when key performance indicators in the long-lived model cross pre-determined thresholds. The alert messages generated by O4 are sent to an external consumer, e.g., the virtualized network controller (e.g., a hypervisor), which acts on these messages to spin-up new firewall VNF VMs, shut down some firewall VNF VMs, or restart existing firewall NVF VMs and so on. This illustrative example demonstrates that any number of actions can be taken by an autonomous system to implement any number of functions in an SDN infrastructure.

In addition, although not specifically specified, one or more steps, functions, or operations of the method 400 may include a storing, displaying and/or outputting step as required for a particular application. In other words, any data, records, fields, and/or intermediate results discussed in the method 400 can be stored, displayed, and/or outputted either on the device executing the respective method or to another device, as required for a particular application. Furthermore, steps, blocks, functions, or operations in FIG. 4 that recite a determining operation or involve a decision do not necessarily require that both branches of the determining operation be practiced. In other words, one of the branches of the determining operation can be deemed as an optional step. Moreover, steps, blocks, functions, or operations of the above described method 400 can be combined, separated, omitted, and/or performed in a different order from that described above, without departing from the examples of the present disclosure.

In one embodiment, the present disclosure also presents a failure management method or protocol. For example, the present method also ensures that if a data source fails, the consumers will reach agreement about which records were produced and quickly resume the consumption of records from other live data sources.

Figure 5:
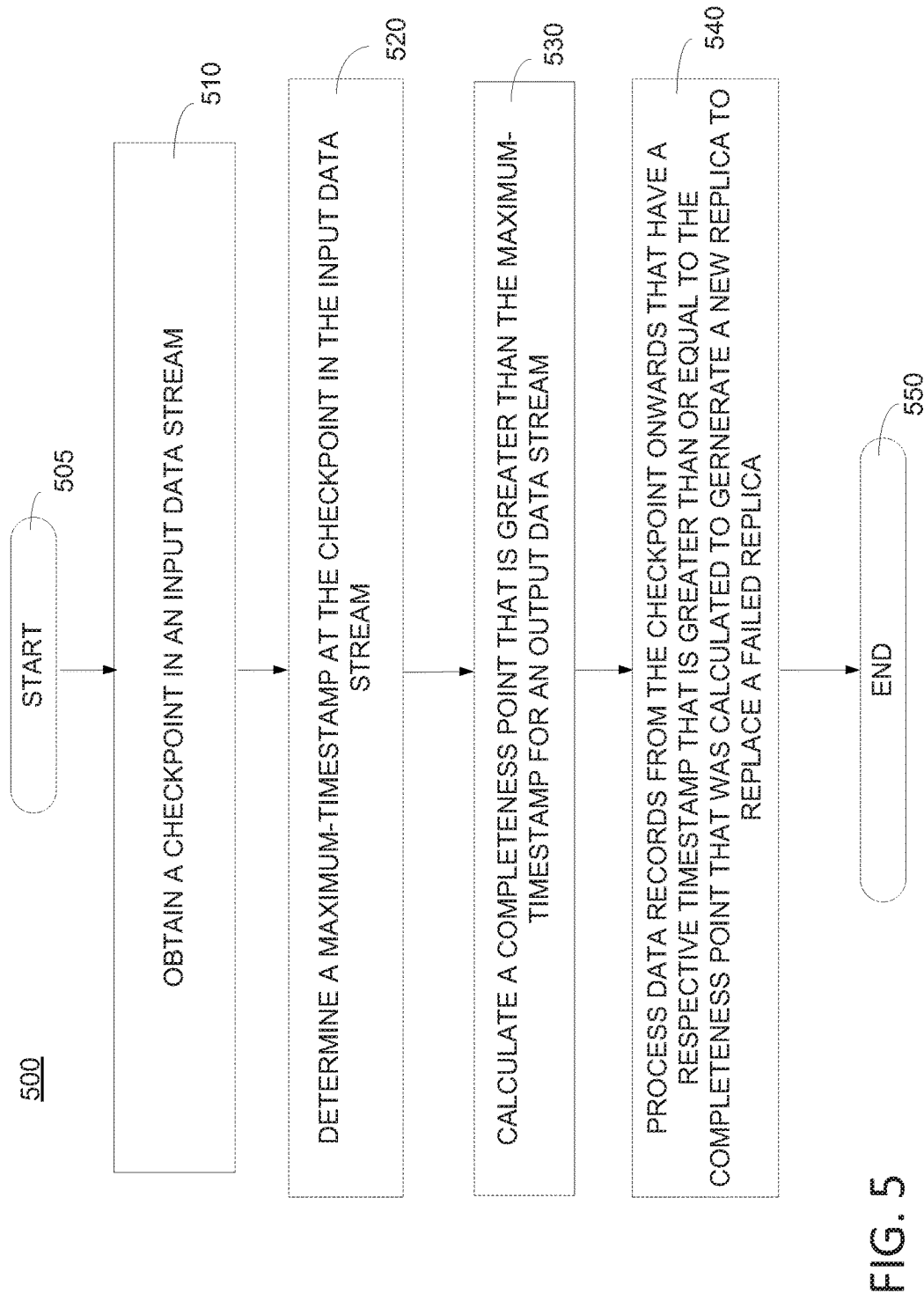
FIG. 5 illustrates a flowchart of an example method for recovering a replica in an operator in a data streaming processing system.

FIG. 5 illustrates a flowchart of an example method 500 for recovering a replica in an operator in a data streaming processing system. In one embodiment, the steps, operations or functions of the method 500 may be performed by any one or more of the components of the system 100 depicted in FIG. 1. For example, in one embodiment, the method 500 is performed by the application server (AS) 190. In another embodiment, the method 500 is performed by AS 190 in coordination with other components of the system 100. In another example, the method 500 is performed by hypervisor 130 of FIG. 1, or by data stream processing system 135 or coordinator 350 in coordination with other components of the system 100. Alternatively, or in addition, one or more steps, operations or functions of the method 500 may be implemented by a computing device having a processor, a memory and input/output devices as illustrated below in FIG. 6, specifically programmed to perform the steps, functions and/or operations of the method. Although any one of the elements in system 100 of FIG. 1 may be configured to perform various steps, operations or functions of the method 500, the method will now be described in terms of an embodiment where steps of the method are performed by a processor, such as processor 602 in FIG. 6. For example, processor 602 may be deployed in a communication network to perform the method 500.

The method 500 begins in step 505 and proceeds to step 510. In step 510, the processor, obtains a checkpoint in an input data stream. For example, a producer operator may store punctuation positions as checkpoints in a distributed persistent queue during processing of data records. The checkpoint may be obtained from the published punctuation that is stored.

In step 520, the processor, determines a maximum-timestamp at the checkpoint in the input data stream. In one embodiment, the punctuation for each data record may be annotated with an additional field referred to as the maximum-timestamp. Depending on the channel properties (e.g., using a distributed persistent queue, buffering at the producer operator, or buffering at the consumer operator) the maximum-timestamp may be obtained from the appropriate location.

In step 530, the processor, calculates a completeness point that is greater than the maximum-timestamp for an output data stream. How the completeness point is calculated may depend on a type of state of the operator. For example, for a stateless operator, the completeness point may be calculated to be any time value that is greater than the maximum-timestamp value. In another example, for a limited state operator, the completeness point may be calculated to be a time value that is greater than a function "RETIREMENT (ts; i)," where ts=the maximum-timestamp and i=0.

In one embodiment, if the operator also accesses an external state or has a long lived state, additional protocols may be executed. For example, in addition to calculating the completeness point as described above, for an operator that also accesses an external state the method 500 may have the system coordinator announce that new external data is available. Each replica may access the new external data. Each replica may post a time "tr" at which each replica can safely switch to processing to the new external data. The system coordinator may post a time "te" where "te">="tr" for each "tr" as the timestamp for which the replicas should switch to processing using the new external data. The replica may block processing for data records whose timestamps would be greater or equal to "tr" until the value of "te" is determined.

When a replica of an operator that accesses external data is started, the replica may choose a completeness point as described above depending on whether the replica is in a stateless operator or a limited state operator. Concurrently, the replica may access the external data and engage in a method that distributes the new external data. If the new external data is only available for an installation time "te" that is larger than the chosen completeness point, then the completeness point may be set to "te."

In another example, in addition to calculating the completeness point as described above, for an operator that also has a long lived state, the method 500 may maintain a state of past data records for indefinite periods of time in an operator. Some examples include complex-event processing (e.g., regular expression matching on events in a data record stream), long-lived customer scoring models, and the like. When the operator has a long-lived state, the methods described above for the stateless operator or the limited state operator may be performed in addition to the method for the operator having a long-lived state.

For example, a new replica may contact a live replica for a state transfer. The live replica may choose a time point "tf" such that the state to be transferred reflects all data records with a timestamp that is less than or equal to "tf," but no data records with a timestamp greater than "tf." The live replica my freeze its state at time "tf" making a copy of the state and block internal processing until the copy is complete. The copy may be transferred to the new replica. The new replica can start processing data records with timestamp "tf" or larger.

In step 540, the processor, processes data records from the checkpoint onwards that have a respective timestamp that is greater than or equal to the completeness point that was calculated to generate a new replica to replace a failed replica. As a result, a new replica may be generated to recover the failed replica with an assurance that the new replica is complete and that data records will only be processed once. In step 550, method 500 ends.

In addition, although not specifically specified, one or more steps, functions, or operations of the method 500 may include a storing, displaying and/or outputting step as required for a particular application. In other words, any data, records, fields, and/or intermediate results discussed in the method 500 can be stored, displayed, and/or outputted either on the device executing the respective method or to another device, as required for a particular application. Moreover, steps, blocks, functions, or operations of the above described method 500 can be combined, separated, omitted, and/or performed in a different order from that described above, without departing from the examples of the present disclosure.

Figure 6:
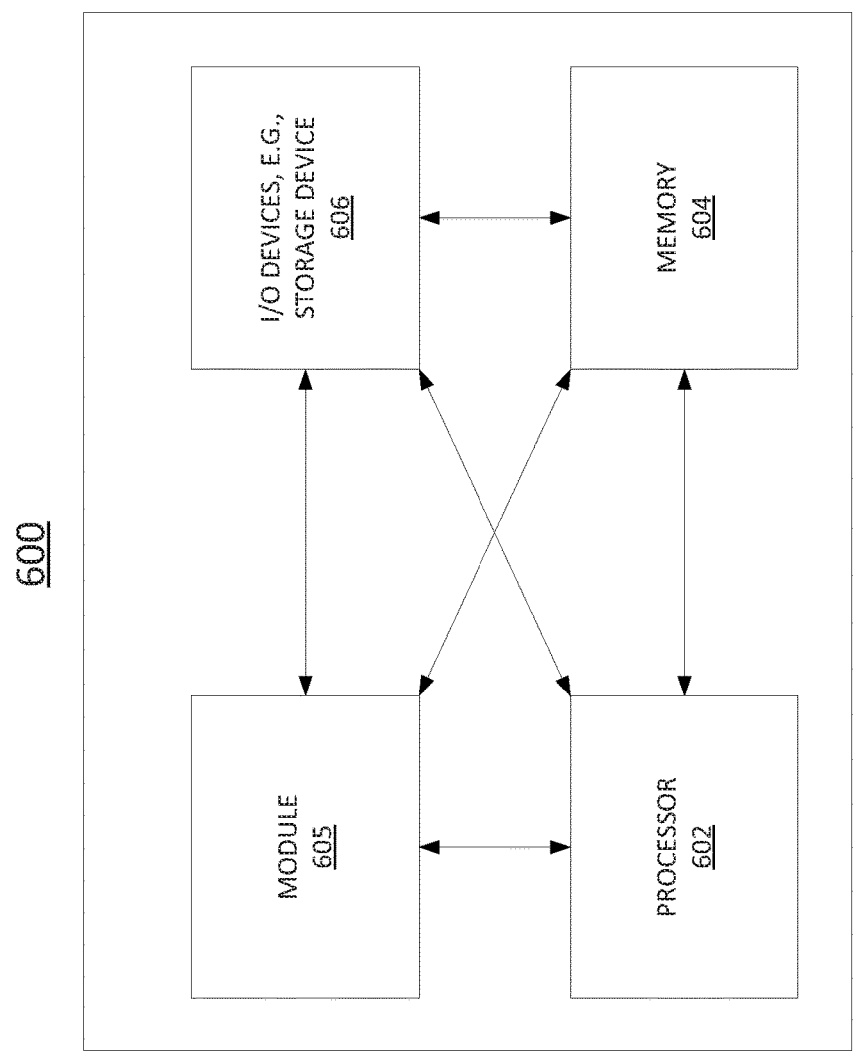
FIG. 6 illustrates a high-level block diagram of a computing device specially configured to perform the functions, methods, operations and algorithms described herein.

FIG. 6 depicts a high-level block diagram of a computing device specifically programmed to perform the functions described herein. As depicted in FIG. 6, the system 600 comprises one or more hardware processor elements 602 (e.g., a central processing unit (CPU), a microprocessor, or a multi-core processor), a memory 604 (e.g., random access memory (RAM) and/or read only memory (ROM)), a module 605 for recovering a replica in an operator in a data streaming processing system, e.g., for processing a stream of records with a guarantee that each record is accounted for exactly once, and various input/output devices 606 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 500 as discussed above is implemented in a distributed or parallel manner for a particular illustrative example, i.e., certain steps of the above method 500, or the entire method 500 is implemented across multiple or parallel computing devices, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA)

including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 500. In one embodiment, instructions and data for the present module or process 605 for recovering a replica in an operator in a data streaming processing system, e.g., for processing a stream of records with a guarantee that each record is accounted for exactly once (e.g., a software program comprising computer-executable instructions) can be loaded into memory 604 and executed by hardware processor element 602 to implement the steps, functions or operations as discussed above in connection with the illustrative method 500. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 605 for recovering a replica in an operator in a data streaming processing system, e.g., for processing a stream of records with a guarantee that each record is accounted for exactly once (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described example embodiments, but should be defined only in accordance with the following claims and their equivalents.

What is claimed is:

1. A device comprising:
a processor of a data stream processing system; and
a computer-readable medium storing instructions which, when executed by the processor, cause the processor to perform operations, the operations comprising:
obtaining a checkpoint in an input data stream;
determining a maximum-timestamp at the checkpoint in the input data stream;
calculating a completeness point that is greater than the maximum-timestamp for an output data stream;
processing data records from the checkpoint onwards that have a respective timestamp that is greater than or equal to the completeness point that was calculated to generate a new replica to replace a failed replica, wherein the new replica and a live replica perform duplicate processing of the input data stream, wherein the new replica and the live replica are distinct; and
when an operator accesses an external state:
receiving from a system coordinator an announcement that a new external data is available;
accessing the new external data;
posting a first time at which the new replica can safely switch to processing data records using the new external data; and
receiving from the system coordinator a second time that is greater or equal to the first time and that indicates when the new replica and the live replica are to switch to using the new external data.

2. The device of claim 1, wherein the checkpoint and the maximum-timestamp are published in a punctuation.

3. The device of claim 1, wherein the checkpoint and the maximum-timestamp are determined from respective values stored in a distributed queue.

4. The device of claim 1, wherein the checkpoint and the maximum-timestamp are determined from respective values stored in a queue of a producer operator.

5. The device of claim 1, wherein the checkpoint and the maximum-timestamp are determined from respective values stored in a buffer of a consumer operator.

6. The device of claim 1, wherein when the operator maintains a long lived state, the operations further comprise:
contacting the live replica for a state transfer;
receiving a time point such that the state transfer reflects all records with timestamps that are less than or equal to the time point;
freezing a state of the live replica at the time point to block internal processing at the live replica until a copy of the state is completed;
receiving the copy of the state from the live replica; and
processing data records with timestamps that are greater than the time point.

7. A method comprising:
obtaining, by a processor, a checkpoint in an input data stream;
determining, by the processor, a maximum-timestamp at the checkpoint in the input data stream;
calculating, by the processor, a completeness point that is greater than the maximum-timestamp for an output data stream;
processing, by the processor, data records from the checkpoint onwards that have a respective timestamp that is greater than or equal to the completeness point that was calculated to generate a new replica to replace a failed replica, wherein the new replica and a live replica perform duplicate processing of the input data stream, wherein the new replica and the live replica are distinct; and
when an operator accesses an external state:
receiving, by the processor, from a system coordinator an announcement that a new external data is available;
accessing, by the processor, the new external data;
posting, by the processor, a first time at which the new replica can safely switch to processing data records using the new external data; and
receiving, by the processor, from the system coordinator a second time that is greater or equal to the first time and that indicates when the new replica and the live replica are to switch to using the new external data.

8. The method of claim 7, wherein the checkpoint and the maximum-timestamp are published in a punctuation.

9. The method of claim 7, wherein the checkpoint and the maximum-timestamp are determined from respective values stored in a distributed queue.

10. The method of claim 7, wherein the checkpoint and the maximum-timestamp are determined from respective values stored in a queue of a producer operator.

11. The method of claim 7, wherein the checkpoint and the maximum-timestamp are determined from respective values stored in a buffer of a consumer operator.

12. The method of claim 7, wherein when the operator maintains a long lived state, the method further comprises:
contacting, by the processor, the live replica for a state transfer;
receiving, by the processor, a time point such that the state transfer reflects all records with timestamps that are less than or equal to the time point;
freezing, by the processor, a state of the live replica at the time point to block internal processing at the live replica until a copy of the state is completed;
receiving, by the processor, the copy of the state from the live replica; and
processing, by the processor, data records with timestamps that are greater than the time point.

13. A non-transitory computer-readable medium storing instructions which, when executed by a processor of a data stream processing system, cause the processor to perform operations, the operations comprising:
obtaining a checkpoint in an input data stream;
determining a maximum-timestamp at the checkpoint in the input data stream;
calculating a completeness point that is greater than the maximum-timestamp for an output data stream;
processing data records from the checkpoint onwards that have a respective timestamp that is greater than or equal to the completeness point that was calculated to generate a new replica to replace a failed replica, wherein the new replica and a live replica perform duplicate processing of the input data stream, wherein the new replica and the live replica are distinct; and
when an operator accesses an external state:
receiving from a system coordinator an announcement that a new external data is available;
accessing the new external data;
posting a first time at which the new replica can safely switch to processing data records using the new external data; and
receiving from the system coordinator a second time that is greater or equal to the first time and that indicates when the new replica and the live replica are to switch to using the new external data.

14. The non-transitory computer-readable medium of claim 13, wherein the checkpoint and the maximum-timestamp are published in a punctuation.

15. The non-transitory computer-readable medium of claim 13, wherein the checkpoint and the maximum-timestamp are determined from respective values stored in a distributed queue.

16. The non-transitory computer-readable medium of claim 13, wherein the checkpoint and the maximum-timestamp are determined from respective values stored in a queue of a producer operator.

17. The non-transitory computer-readable medium of claim 13, wherein the checkpoint and the maximum-timestamp are determined from respective values stored in a buffer of a consumer operator.

18. The non-transitory computer-readable medium of claim 13, wherein when the operator maintains a long lived state, the operations further comprise:
contacting the live replica for a state transfer;
receiving a time point such that the state transfer reflects all records with timestamps that are less than or equal to the time point;
freezing a state of the live replica at the time point to block internal processing at the live replica until a copy of the state is completed;
receiving the copy of the state from the live replica; and
processing data records with timestamps that are greater than the time point.

* * * * *